Figure 6:
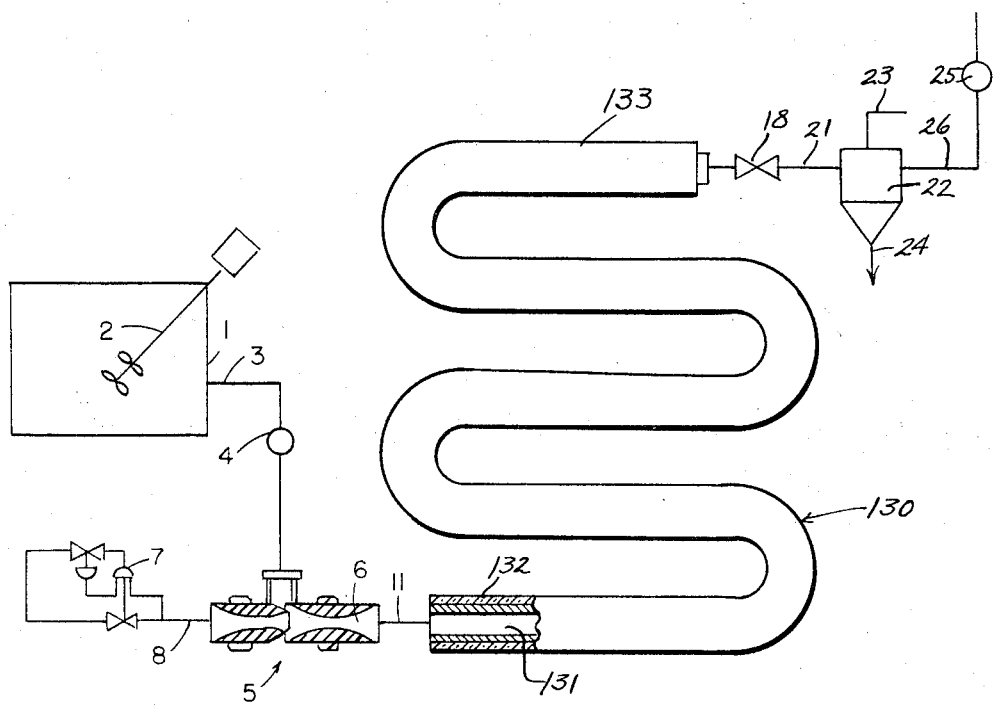

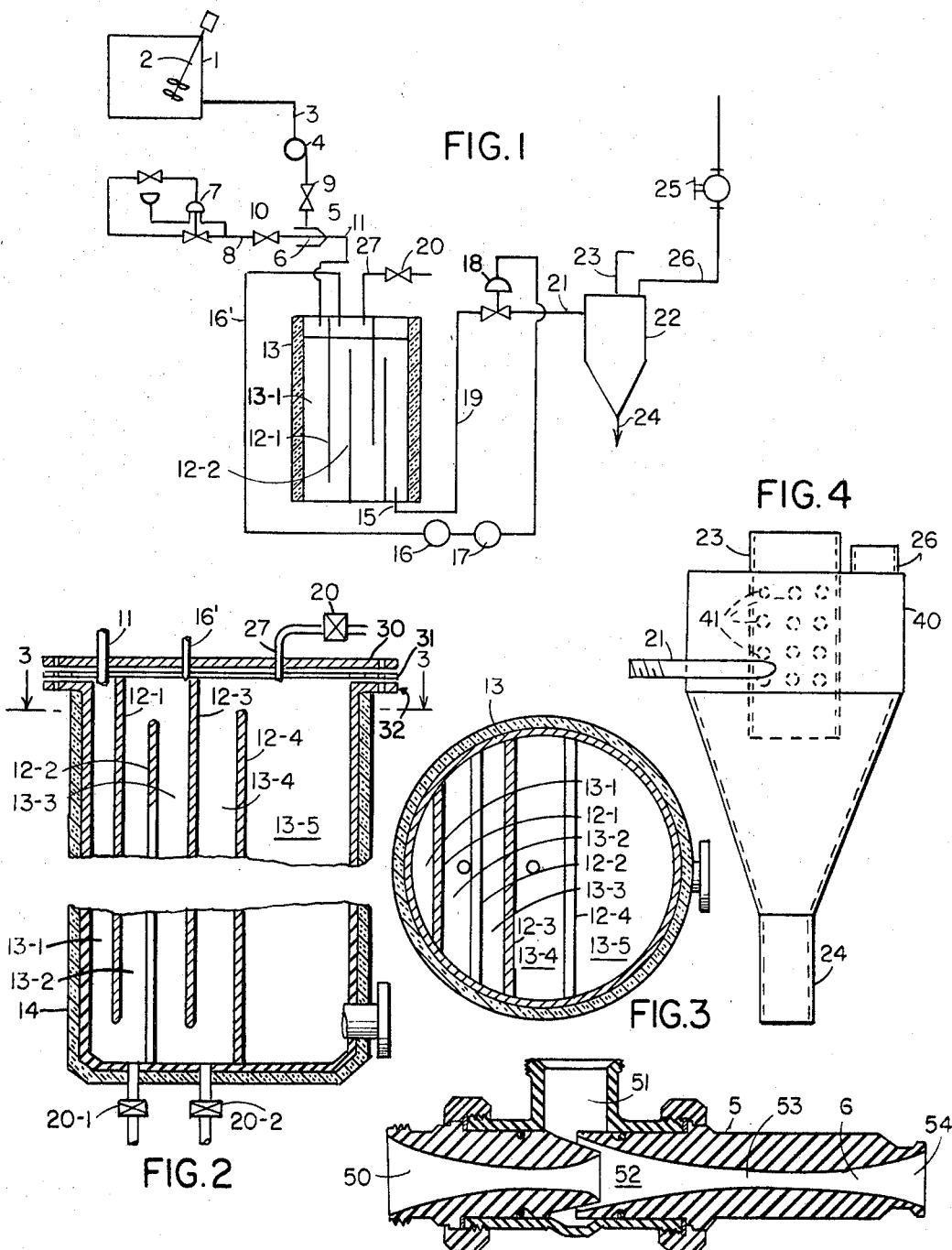

United States Patent Office 3,424,613
Patented Jan. 28, 1969

3,424,613
CONTINUOUS PRODUCTION OF INDUSTRIAL
STARCH PASTES
Kenneth J. Huber and Jack F. Johnston, Granite City, Ill., and Edward K. Nissen and De Witt R. Pourie, St. Louis, Mo., assignors to Union Starch and Refining Co., Inc., Columbus, Ind., a corporation of Indiana
Continuation-in-part of application Ser. No. 290,099, June 24, 1963. This application Nov. 18, 1965, Ser. No. 508,513
U.S. Cl. 127—28                                     2 Claims
Int. Cl. C13l 1/00

This invention relates to an apparatus for the continuous production of starch pastes.

This application is a continuation-in-part of U.S. application Ser. No. 290,099 filed June 24, 1963, now U.S. Pat. No. 3,220,884.

Among the objects of the invention is to provide an apparatus for the continuous production of starch pastes.

Among other objects of the invention is to provide an apparatus for continuously supplying a starch paste that has a relatively low and uniform viscosity and that resists gelling when stored.

Cooked starches such as used in the paper industry, for example, are conventionally prepared by the batch process. Batch prepared, cooked starches unless modified by enzyme conversion or preconverted at the producer's plant have relatively high viscosities and they tend to gel on storage. Also such batch processes are time consuming and require a maximum of attention during the cooking treatment.

Among other objects of the invention, therefore, is to provide an apparatus for preparing a starch paste of improved quality and consistency at lower handling costs.

The objects of the invention are attained by providing means for feeding an aqueous starch slurry to a steam-injection heater to substantially instantly heat and gelatinize the starch, means for continuously conducting the gelatinized starch paste under pressure to continue the conversion until the starch liquor is converted to a paste having the desired paste characteristics (of a modified starch paste, for example); means for separating excess steam, etc., from the paste and for continuously collecting the paste.

This invention is especially useful with corn starch but may be employed with any type of starch such as the starches from wheat, potatoes, tapioca, rice and waxy maize. Although the invention is especially useful for treating unmodified starch thereby avoiding the treatments necessary to modify such starches, it may also be employed for treating thin-boiling, oxidized, ethylated, and other chemically modified starches.

The amount of starch in the slurry depends on the particular starch employed and on the properties desired in the final product but generally the slurry will contain about ½ to 3 or even 3.5 lbs. of starch per gallon. Various preservatives, bactericides, chemicals, etc. may be incorporated into the slurry.

The starch is fed from the slurrying tank to the steam injection zone at a constant rate. A rate of 3 to 12 gallons per minute has been found very satisfactory for a single ¾″ injection nozzle, for example.

The steam pressure applied to the injection nozzle may vary from about 60 to about 140 pounds per square inch gauge pressure (p.s.i.g.) to permit conversion temperatures ranging from 250 to 350° F. Below about 250° F. the starch is not completely cooked and the paste resembles that obtained by cooking at atmospheric pressure. Above about 350° F. the paste may be caramelized.

The period, from the time a given slurry leaves the nozzle assembly until it is passed out of the final cooker, will also depend on the type of starch and the properties desired in the final product but periods of about 3–12 minutes have been found to be very satisfactory.

After the starch paste leaves the injector zone, the cooking is continued under pressure at temperatures of between about 250° F. and 350° F. The pressure supplied by the steam of the injector forces the paste, in a closed system, through the chamber which is constructed to prevent channelling of the paste and to provide a path of sufficient length to finish the cooking of the starch.

The starch paste as it leaves the final converting and pressure zone can be separated at atmospheric pressure from the excess steam and vapor by centrifugal means.

The following table summarizes conditions for satisfactory operation of the process.

|  | Optimum | Maximum | Minimum |
|---|---|---|---|
| Through-put rate (g.p.m.) | 5 | 12 | 3 |
| Steam pressure (p.s.i.g.) | 100 | 140 | 60 |
| Tank level | Full | Full | Empty |
| Retention time with full tank (min.) | 8 | [2] 3½ | 12 |
| Discharge temperature (° F.) | 320 | 350 | 250 |
| Paste concentration [1] (lb./gal.) | ½–3.5 |  |  |

[1] Dependent on the type of starch.
[2] The maximum is with respect to speed, etc. so that a lower retention time indicates greater speed of flow.

In the drawing:
FIG. 1 is a flow diagram of the overall apparatus.
FIG. 2 is a view, partly in cross-section, of the cooking tank portion of the apparatus of FIG. 1.
FIG. 3 is a cross-sectional view taken on line 3—3 of FIG. 2.
FIG. 4 is a detail view of the vapor separating means.
FIG. 5 is a detail view of the steam injector device.
FIG. 6 is a view similar to FIG. 1 showing in detail a modified form of cooker.

The slurry is formed in tank 1 which is provided with an agitator 2. The slurry connects through line 3 to a positive displacement pump 4 which feeds the slurry through valve 9 to the steam injector heater 5. Steam is fed through a pressure regulating and adjusting valve means 7 to line 8, valve 10 to the injector heater 5. The injection heater is shown diagrammatically in FIG. 1. Valve 10 is not essential. The granules of starch in the slurry are instantly heated in injector 5 and discharged through orifice 6 into line 11 under pressure. The end of line 11 feeds into the top of chamber 13–1 of cooking vessel 13, (see FIGS. 1, 2 and 3), the incompletely cooked paste passed down through chamber 13–1, under baffle 12–1, upward through chamber 13–2 over baffle 12–2, down chamber 13–3, under baffle 12–3, up through chamber 13–4, over baffle 12–4, down chamber 13–5 and out pipe 15. The paste moves through said chambers without channelling under the pressure resulting from the steam incorporated therein. The vessel 13 is closed to the atmosphere and has a heat jacket and/or insulating covering 14. The small needle valve 20 on the top of the tank is used only to vent off non-condensible gases and does not effectively lower the pressure inside the vessel 13. The valve 20 is connected to the inside of tank 13 through pipe 27. Discharge valves 20–1 and 20–2 are provided at the bottom of the tank 13 to facilitate cleaning the same.

The level of paste in vessel 13 is regulated by the automatic level transmitter 16 which senses the pressure differential between the vapor at the top of chambers 13–2 and 13–3 trough pipe 16' and the hydraulic pressure in line 15, and through controller 17, automatically adjusts the opening of valve 18 to control the flow of paste through line 19.

The paste from valve 18 flashes to atmospheric pressure through line 21 into a centrifugal separator 22. Steam and other vapors are removed through vent 23 while the final product flows through line 24. Water can be metered into the separator 22 through line 26 with the aid of a metering pump 25.

As shown in more detail in FIG. 5, the injector-heater device 5 comprises an inlet 50 for the steam (coming from adjusting valve means 7 of FIGS. 1 or 2) and inlet 51 for the starch slurry (coming from valve 9, FIG. 1, not shown in FIGS. 2 and 5). The discharge passage 6 of the injector-heater 5 has a restricted zone 53 between the entrance 52 and the discharge opening 54. Injector-heaters with a discharge passage having a restricted zone as shown are not new but among the many such injector-heaters that are available, this particular type has advantages with the present invention in that the at least partially gelatinized starch formed in the zone 52 is subjected to high shear as it passes the minimum dimension 53 of the discharge passage providing maximum viscosity reduction.

The cooker 13 can be round, as shown in FIG. 3, or rectangular or trapezoidal in cross-section. In each case the baffle arrangement will be substantially the same except that the number of baffles may be varied or the spacing thereof may be adjusted. In the cooker of FIGS. 2 and 3 the baffles 12–1 and 12–3 are attached to the cover 30 and the baffles 12–2 and 12–4 are secured to the vessel 13, itself. Cover 30 also contains openings for the pipe 11, 16' and 27. A gasket 31 is provided to seal the cover 30 to the flanges 32 of vessel 13. Valves 20–1 and 20–2 are provided between the chambers formed by the baffles 12–2 and 12–4 and the side of the vessel 13 to permit cleaning of the cooker. The baffles are preferably constructed so that about ¼ to ⅓ of the total tank volume is in the last chamber 13–5.

The gelatinized starch solution from the bottom of the last chamber 13–5 of vessel 13 is fed tangentially into the upper cylindrical portion 40 at the separator 22 (see FIG. 4) by means of pipe 21. Water from pipe 26 may be fed to the periphery of cylindrical portion 40 to mix with and dilute the solution and condense the excess steam. Air, uncondensed steam and other vapors are withdrawn through pipe 23, the portion of which extends into separator 22 being perforated as shown at 41 of FIG. 4. A gelatinized starch solution ready for use is withdrawn from the discharge opening 24.

FIG. 6 illustrates another form of cooker device with other parts of the complete apparatus shown diagrammatically. As shown in FIG. 6, the starch from the injector-heater 5 is fed to the lower starch 131 of an insulated pipe 132 and is of sufficient total length and sufficient capacity to complete the cooking of the incompletely cooked starch paste as it comes from the mouth 6 of injector-heater 5. After passing through the upper stretch 133 of coil cooker 130, the starch is treated as described above.

The following example illustrates how the apparatus is employed to make starch paste.

In the examples the viscosity was directly measured in centipoise units by means of a Brookfield viscometer using a #1 spindle at 20 revolutions per minute.

Example 1

A slurry containing 2 lbs. dry substance (D.S.) starch per gallon was made in the slurry vessel 1 and passed at a speed of 6 gallons per minute through the injector-heater 5 operated at a steam pressure of about 100 p.s.i.g. The tank 13 of about 50 gallon capacity was heated to 300° F. and was maintained substantially full at a pressure of 100 p.s.i.g. Dilution water at 95° F. was added at 26 in accordance with the table below.

| Dilution water (g.p.m.) | Percent dry substance (oven method) | Viscosity (cps.) [1] |
|---|---|---|
| 0 | 18.2 | 66 |
| 1 | 17.4 | 55 |
| 2 | 13.7 | 26 |
| 3 | 13.2 | 26 |
| 4 | 12.2 | 18 |
| 5 | 11.1 | 19 |
| 6 | 9.5 | 18 |

[1] Brookfield Viscometer, #1 spindle at 20 r.p.m., samples read at 140° F

The above viscosities match the viscosity characteristics of a starch which has been chemically preconverted in the supplier's plant. For example; the viscosities correspond to what are commonly known in the trade as low viscosity oxidized starches or ethylated starches depending on the modification involved.

Example 2

The process was conducted as in Example 1 except that a slurry with 2.5 lbs./gal. of D.S. starch, a pump speed of 5 gal./min., a cooking temperature of 295° F. and a tank pressure of 100 p.s.i.g., were employed. Various proportions of dilution water at 95° F. were added, as indicated, produced samples with the properties set forth in the following table:

| Dilution water (g.p.m.) | Percent solids (RI) [1] | Dilution temp. | Viscosity (cps.) | At sample temp. |
|---|---|---|---|---|
| 0 | 25 | 210 | 420 | 136 |
| 2.9 | 15 | 206 | 56 | 135 |
| 4.0 | 14 | 203 | 42 | 140 |
| 4.8 | 12 | 199 | 41 | 137 |
| 7.3 | 10 | 186 | 26 | 139 |
| 8.9 | 8 | 176 | 24 | 140 |
| 10 | 7 | 163 | 18 | 140 |

[1] RI = Refractive index which was used as a direct indication of solid content using an Erma pocket refractometer with the standard 0–27% starch solids scale.

Example 3

In this example the process was conducted so as to obtain a 15% final solids paste for use directly in the machine sizing of food grade board. The original slurry contained 2.5 lb./gal. of D.S. starch, the pump speed was 5 gal./min., the cooking tank was maintained substantially full and at a temperature of 295–300° F. The dilution water was at 70° so as to provide a paste temperature of about 150° F. when said paste reaches the sizing machine. The following samples were taken at about 15 min. intervals:

| Dilution water (g.p.m.) | Percent solids (RI) | Viscosity (cps.) | At sample temp. |
|---|---|---|---|
| 3.2 | 15 | 60 | 130 |
| 3.2 | 15 | 49 | 140 |
| 3.2 | 15.5 | 30 | 140 |
| 3.2 | 15 | 31 | 140 |
| Sample of composite | 15 | 36 | 140 |
| Sample of composite held 1 hr. | 15 | 32 | 140 |
| 3.4 | 15 | 38 | 132 |
| 3.4 | 15 | 31 | 133 |
| 3.4 | 16.5 | 38 | 142 |
| 3.4 | 18 | 82 | 140 |
| Sample of composite | 16.5 | 40 | 138 |

The "composite" referred to in the table were mixtures of equivalent portions of the samples immediately thereabove.

Samples of the board coated with this product were compared with samples of the board coated with an equivalent viscosity oxidized starch. Test results were substantially equivalent except for a lowering of the air permeability of the board coated with the pressure converted product.

Example 4

The process was conducted as in Example 3 but with a slurry of 3 lb./gal. of D.S. starch and with dilution water added at the rate of about 5.1 gal./min. to provide a final paste of about 14% solids. The resultant pastes had a slightly higher viscosity than those of Example 3.

The features and principles underlying the invention described above in connection with specific exemplifications will suggest to those skilled in the art many other modifications thereof. It is accordingly desired that the appended claims shall not be limited to any specific feature or details thereof.

We claim:

1. A continuous starch converting apparatus comprising means for forming a starch slurry,
a steam-injection heater comprising means for injecting steam under pressure into a stream of slurry introduced therein,
means for feeding a continuous stream of slurry to said steam-injection heater,
pressure converting means comprising an insulated, closed tank containing transverse baffles arranged to provide a continuous path for the paste therein without channelling, while maintaining the paste under pressure,
pipe means connecting the steam-injection heater to said pressure converting means whereby to supply said paste to said tank under pressure,
paste collecting means open to the atmosphere,
pipe means connecting the pressure converting means to the past collecting means,
valve means connected to the upper portion of said pressure cooking means for regulating release of non-condensible gases.

2. A continuous starch converting apparatus comprising means for forming a starch slurry,
a steam-injection heater comprising means for injecting steam under pressure into a stream of slurry introduced therein,
means for feeding a continuous stream of slurry to said steam-injection heater,
pressure converting means comprising an insulated pipe line having a lower stretch and a multiplicity of curves leading to an upper stretch and providing a continuous path for the paste therein without channelling while maintaining the paste under pressure,
pipe means connecting the steam-injection heater to the lower stretch of said pressure converting means whereby to supply said paste to said pipe line under pressure,
paste collecting means open to the atmosphere,
pipe means connecting the pressure converting means to the paste collecting means,
valve means connected to the upper portion of said pressure cooking means for regulating release of non-condensible gases.

References Cited

UNITED STATES PATENTS

| | | | |
|---|---|---|---|
| 2,735,792 | 2/1956 | Kroyer | 127—28 X |
| 2,805,966 | 9/1957 | Etheridge | 127—32 |
| 3,133,836 | 5/1964 | Winfrey et al. | 127—32 X |
| 3,220,884 | 11/1965 | Huber et al. | 127—71 |
| 3,308,037 | 3/1967 | Goos et al. | 127—71 |
| 3,348,972 | 10/1967 | Taylor | 127—28 |

MORRIS O. WOLK, *Primary Examiner.*

S. MARANTZ, *Assistant Examiner.*

U.S. Cl. X.R.

127—32, 36, 38